United States Patent

Sato

[15] 3,698,302

[45] Oct. 17, 1972

[54] CIRCUIT FOR PREVENTING FALSE OPERATION OF AN ELECTRONIC CAMERA SHUTTER

[72] Inventor: Takayoshi Sato, Tokyo, Japan

[73] Assignee: Kabushikikaisha Copal, Tokyo, Japan

[22] Filed: Oct. 29, 1970

[21] Appl. No.: 85,210

[30] Foreign Application Priority Data

Nov. 14, 1969 Japan ....................44/108771

[52] U.S. Cl. ...............................95/10 CT, 95/53 EB

[51] Int. Cl. ............................G03b 7/08, G03b 9/62

[58] Field of Search.....95/10 C, 10 CE, 10 CT, 53 E, 95/53 EA, 53 EB

[56] References Cited

UNITED STATES PATENTS 3,324,779 6/1967 Tsukumo Nobusawa et al......................95/10 CT 3,347,141 10/1967 Tsukumo Nobusawa et al......................95/10 CT

*Primary Examiner*—Joseph F. Peters, Jr.

*Attorney*—Kelman and Berman

[57] ABSTRACT

A circuit for preventing false operation of an electronic shutter includes a diode connected in the R-C circuit of the light integrating portion of the circuit which diode inhibits untimely discharge of the integrating capacitor in the presence of undesired contact chatter in the switching means associated with the circuit.

3 Claims, 3 Drawing Figures

INVENTOR
Takayoshi Sato
BY Kelman and Berman
AGENTS

CIRCUIT FOR PREVENTING FALSE OPERATION OF AN ELECTRONIC CAMERA SHUTTER

BACKGROUND OF THE INVENTION

The present invention relates to a circuit for preventing the false operation of the electronic shutter of a through-the-lens type camera due to chattering of the switch in the electronic shutter.

The present invention is particularly useful when used with the electronic shutter disclosed in my copending U.S. Pat. Application, Ser. No. 63,214, filed Aug. 12, 1970 although the present invention may be used advantageously with any conventional electronic shutter.

An electronic shutter of the type described above is actuated as follows. During initial operation of the shutter release of the camera, light from the object to be photographed is received, through the objective lens of the camera, by a photoelectric element, such as a photoconductive element or a photovoltaic element connected in an integrating circuit having transistors and a capacitor, such that a reference time interval is established in the integrating circuit in accordance with the intensity of light received by the photoelectric element and the time constant of the circuit as dictated by the capacitor and the photoelectric element. During this reference time interval, a second photoelectric element in the camera receives light from the object directly, without passing through the objective lens, so that a memory circuit connected to the integrating circuit and including the above second photoelectric element, a transistor and a second capacitor, is actuated so as to electrically charge (or discharge) the second capacitor through the above second photoelectric element, thereby establishing a reference voltage in the memory circuit, in accordance with the above reference time interval and the intensity of light received by the second photoelectric element. As the operation of the shutter release proceeds, the shutter blade is opened, while an exposure control circuit, connected to the memory circuit, and having a third photoelectric element, a transistor and a third capacitor, is actuated so as to electrically charge (or discharge) the third capacitor through the third photoelectric element, which also receives light from the object to be photographed directly, without passing through the objective lens. The voltage appearing across the third capacitor during the actuation of the exposure control circuit is compared with the above reference voltage established in the memory circuit so as to actuate a switching circuit connected to the exposure control circuit when the voltage of the third capacitor reaches a predetermined value with respect to the above reference voltage, thereby closing the shutter blade to obtain the proper exposure time, regardless of any variation in the intensity of the light which may occur after the shutter blade is opened.

The second photoelectric element may be made to perform double duty as the third photoelectric element by switching the connections thereof from the memory circuit to the exposure control circuit.

If variations in the intensity of the received light during exposure may be ignored, the second and the third photoelectric elements may be replaced by fixed or variable resistors, respectively.

In the above electronic shutter, the memorizing operation is commenced by closure of a switch in the memory circuit. However, chattering may be experienced in the switch when it is closed, thereby resulting in an error in the reference voltage, so that the accuracy of the exposure deteriorates.

The present invention aims at avoiding the above described disadvantages of an electronic shutter.

SUMMARY OF THE INVENTION

An object of the present invention is to provide a novel and useful circuit for preventing false operation of the electronic shutter of a through-the-lens type photographic camera, due to chattering of the switch in the electronic shutter.

The above object is achieved, in accordance with the present invention, by connecting a diode between the first photoelectric element and the first capacitor in the integrating circuit so as to prevent any undesired discharge of the first capacitor during chattering of the switch which is provided to close the integrating and the memory circuit.

DETAILED DESCRIPTION OF THE PREFERRED EMBODIMENT

Figure 1:
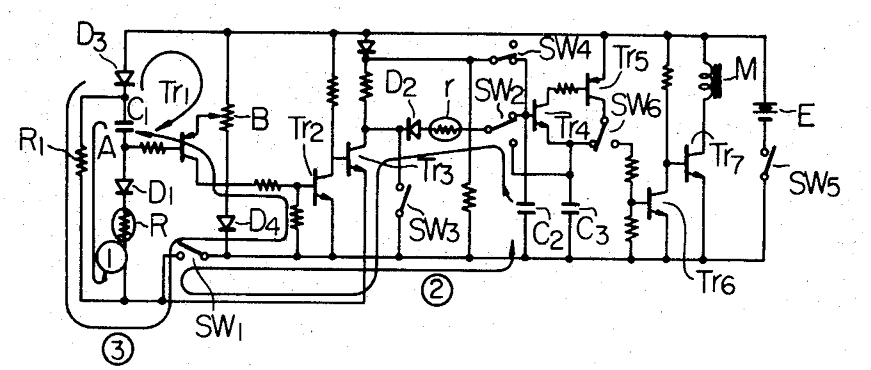
FIG. 1 is a diagram showing the circuit of an electronic shutter incorporating the present invention.

In FIG. 1, the circuit of the present invention comprises: an integrating circuit including a photoelectric element R, which receives the light from the object to be photographed through the objective lens of the camera, a capacitor $C_1$, a diode $D_1$ connected between the photoelectric element R and the capacitor $C_1$, and transistors $Tr_1$ and $Tr_2$; a memory circuit including a photoelectric element r receiving light from the object directly without passing through the objective lens, a capacitor $C_2$ and a transistor $Tr_3$; an exposure control circuit including a capacitor $c_3$ and a transistor $Tr_4$, the photoelectric element r being connected to the exposure control circuit by switching the connection thereof from the memory circuit by means of switches $SW_2$ and $SW_3$; a switching circuit including transistors $Tr_5$, $Tr_6$, $Tr_7$ and an electromagnet M for actuating the shutter blade arresting means (not shown) to hold the shutter blade opened for the exposure when energized, and an electric source E, the integrating and the memory circuit being closed by switch SW1, switches $SW_4$ to $SW_6$ being connected as shown for switching the electric circuit for sequential operation.

In operation, the switch $SW_5$ is closed during the initial part of the operation of the shutter release, so that capacitors $C_2$ and $C_3$ are charged, through switches $SW_4$ and $SW_6$ respectively so as to be ready for operation.

As the actuation of the shutter release proceeds, the switches $SW_4$, $SW_6$ are opened while the switch $SW_1$ is closed, so that the capacitor $C_1$ is charged through the photoelectric element R, while the transistor $Tr_3$ is rendered conductive to commence discharge of capacitor $C_2$ through the path indicated by the arrow ② . As the charging of capacitor $C_1$ proceeds, the voltage at juncture A in FIG. 1 is lowered, and, when the base voltage of the transistor Tr1, the base of which is connected to the juncture A reaches the emitter voltage of the transistor $Tr_1$ appearing at juncture B, the transistor $Tr_1$ is made conductive and hence, the transistor $Tr_2$ is also rendered conductive, so that the transistor $Tr_3$ is rendered non-conductive, thereby terminating the discharge of capacitor $C_2$. Thus a reference voltage is established in the capacitor $C_2$ which corresponds to the reference time interval which is indicative of the intensity of light received from the object, as determined by the time constant dictated by the capacity of the capacitor $C_1$ and the resistance of the photoelectric element R.

Then, the switch $SW_2$ is opened and the switch $SW_3$ is closed, simultaneously with the opening of the shutter blade, which is held opened by the shutter blade arresting means actuated by the electromagnet M, so that the discharge of the capacitor $C_3$, through the photoelectric element $r$, begins and the terminal voltage of the capacitor $C_3$, appearing at the emitter of the transistor $Tr_4$ is compared with the reference voltage of the capacitor $C_2$, appearing at the base of the transistor $Tr_4$. Thus, when the emitter voltage of the capacitor $C_3$ reaches the base voltage thereof, the transistor $Tr_4$ is rendered conductive, and hence, the transistors $Tr_5$ and $Tr_6$ are also rendered conductive, so that the transistor $Tr_7$ is made non-conductive, thereby deenergizing the electromagnet M, and freeing the shutter blade arresting means. Thus the shutter blade is closed so that the proper exposure is achieved.

During the above operation, when the switch $SW_1$ is closed, chattering is unavoidably generated in the switch contacts, resulting in the repetition of the closing and opening of the switch $SW_1$.

Figure 2:
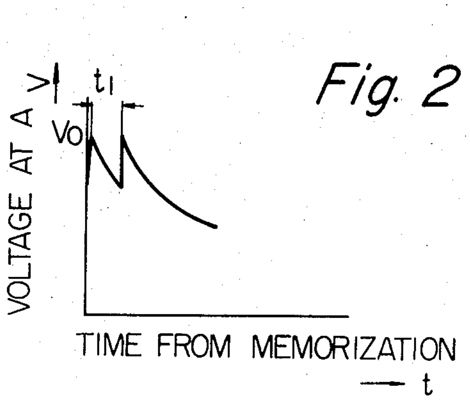
FIG. 2 is a diagram showing the variation of the voltage across the capacitor in the integrating circuit of a prior art electronic shutter.

If diode $D_1$ is not provided in the circuit, the charge on capacitor $C_1$, which is stored therein by the closure of the switch until it is reopened by the chattering, is discharged through the path indicated by arrow ① , and charging of the capacitor $C_1$ resumes when switch $SW_1$ is again closed, during chattering. Thus, the charging characteristics of the capacitor $C_1$ when no diode is provided is as shown in FIG. 2. Thus, the reference time interval during which the base voltage of the transistor $Tr_1$ reaches the trigger voltage thereof is extended, thereby resulting in an erroneous reference voltage being provided to capacitor $C_2$.

Figure 3:
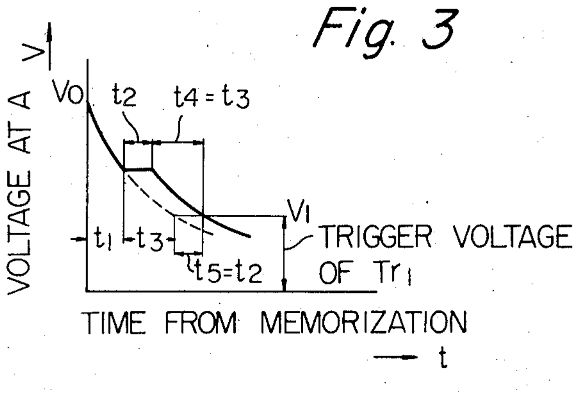
FIG. 3 is a diagram showing the variation of the voltage across the capacitor in the integrating circuit of the electronic shutter of the present invention.

In accordance with the present invention, a diode $D_1$ is connected between capacitor $C_1$ and the photoelectric element R, whereby discharge of capacitor $C_1$ through the path ① , due to the chattering of switch $SW_1$, is prevented, so that the charging characteristics of capacitor $C_1$ is as shown in FIG. 3. Assuming that the switch $SW_1$ is opened for a time interval $t_2$, after the closure thereof for the time interval $t_1$, charging of capacitor $C_1$ ceases for the time interval $t_2$ and capacitor $C_1$ maintains the voltage thus far developed thereacross. Since discharge of capacitor $C_2$ is also stopped during the opening of switch $SW_1$, during the chattering of switch $SW_1$, in like manner as the charging of capacitor $C_1$, no discharge thereof is being permitted during chattering by the provision of diode $D_1$, the net charging time of capacitor $C_1$ and hence, the net discharge time of capacitor $C_2$ are unchanged, regardless of the occurrence of the chattering in switch $SW_1$. In FIG. 3, the net charging time is $t_1+t_3$, while the actual time sequence is indicated by $t_1$, $t_2$, $t_4$, the trigger voltage of transistor $Tr_1$ being indicated by $V_1$. Since the charging characteristics of the capacitor $C_1$ is kept unchanged, $$t_2=t_5$$

therefore, $$t_1+t_4=t_1+t_3.$$

Thus, the reference voltage developed in the capacitor is highly accurate.

In FIG. 1, the base and the emitter of transistor $Tr_2$ are connected to the negative terminal of electric source E, in order to prevent forward current between the collector and the base of transistor $Tr_1$, which might otherwise act as a diode.

Diode $D_4$ is a varistor used for compensation, and is connected to the negative terminal of electric source E, in order to maintain the voltage at juncture B constant even if the magnitude of the output voltage from source E should vary.

Diode $D_3$ is a varistor used for compensation of the base emitter voltage of transistor $T_1$ by the connection of resistor $R_1$.

Additionally, diode $D_3$ serves to prevent the discharge of the capacitor $C_1$ and also provides temperature compensation for transistor $Tr_1$.

The discharging of capacitor $C_1$, for the next cycle of operation is effected along path ③ in FIG. 1, through the collector and the base of transistor $Tr_1$, by closure of switch $SW_1$. Switch $SW_1$ is opened in coupled relationship to the winding operation of the film for the next exposure.

The capacitors $C_2$ and $C_3$ have been described as being discharged for operation, after they have been preliminarily charged. However, it is apparent that they may be charged for operation, without preliminarily being charged.

It is also apparent that the photoelectric element r may be replaced by a variable resistor or by a fixed resistor, when variations in the intensity of light received from the object, during exposure, may be ignored in obtaining the proper exposure.

I claim:

1. A circuit for preventing false operation of an electronic shutter of the type employed in a through-the-lens camera, which comprises, in combination:

a d.c. source;

an integrating circuit, connected to said source, and including: a capacitor; a photoelectric element serially connected to said capacitor, said element receiving light from the object to be photographed through the lens of said camera; a transistor, the base thereof being connected to the juncture of said capacitor and said photoelectric element, and; switching means for establishing a reference time interval of conduction in said transistor, as determined by charging of said capacitor through said photoelectric element when said switching means is closed, said reference time interval being representative of the intensity of the light received by said photoelectric element, and determined by the time constant of said capacitor and said photoelectric element, said transistor conducting only when the voltage developed across said capacitor exceeds the threshold voltage thereof;

a memory circuit, connected to said integrating circuit, and enabled by closure of said switching means during said reference time interval, for generating a reference voltage therein which corresponds to the intensity of light received from said object;

an exposure control circuit, connected to said memory circuit and actuated simultaneously with the opening of the shutter blades of said camera, for generating a time-varying voltage;

a switching circuit, connected to said exposure control circuit, for closing said shutter blades when said time-varying voltage reaches a predetermined level, with respect to said reference voltage, so as to obtain the proper exposure time for said shutter, in accordance with the intensity of light received from said object; and diode means, connected in said serial connection of the capacitor and photoelectric element in said integrating circuit, to inhibit discharge of said capacitor, and hence an erroneous reference time interval, due to chatter of the contacts in said switching means.

2. The circuit according to claim 1 wherein said memory circuit comprises:

a capacitor;

a resistor connected to said capacitor: and a transistor, having its collector connected to said resistor, its emitter connected to said integrating circuit and to said switching means, and its base connected to receive said reference time interval signal; and, said exposure control circuit comprises:

a capacitor;

a resistor connected to said capacitor; and a transistor having its emitter connected to said capacitor and its base connected to the capacitor of said memory circuit to receive said reference voltage, whereby proper exposure of said camera is ensured as determined solely by light conditions existing prior to initiation of the exposure.

3. The circuit according to claim 1 wherein said memory circuit comprises:

a capacitor;

a photoelectric element, connectable to said capacitor, and receiving light from the object to be photographed directly, without passing through the lens of said camera; and a transistor, having its collector connected to said photoelectric element, its emitter connected to said integrating circuit and to said switching means, and its base connected to receive said reference time interval signal; and said exposure control circuit comprises:

a capacitor;

means for selectively switching the photoelectric element associated with said memory circuit to said capacitor in synchronism with the opening of the shutter blades; and a transistor having its emitter connected to said capacitor and its base connected to the capacitor associated with said memory circuit to receive said reference voltage, whereby proper exposure of said camera is ensured, regardless of variations in the intensity of light received from said object after an exposure cycle has been initiated.

* * * * *